United States Patent
Petillon

(10) Patent No.: US 9,477,629 B2
(45) Date of Patent: Oct. 25, 2016

(54) INFORMATION EXCHANGE SYSTEM COMPRISING A CHAIN OF MODULES CONNECTED TOGETHER BY HARDENED DIGITAL BUSES

(71) Applicant: AIRBUS HELICOPTERS, Marignane (FR)

(72) Inventor: Jean Paul Petillon, Miramas (FR)

(73) Assignee: Airbus Helicopters, Marignane (FR)

( * ) Notice: Subject to any disclaimer, the term of this patent is extended or adjusted under 35 U.S.C. 154(b) by 492 days.

(21) Appl. No.: 14/030,196

(22) Filed: Sep. 18, 2013

(65) Prior Publication Data
US 2014/0089542 A1    Mar. 27, 2014

(30) Foreign Application Priority Data
Sep. 21, 2012    (FR) ..................................... 12 02507

(51) Int. Cl.
| | |
|---|---|
| G06F 13/42 | (2006.01) |
| G06F 13/38 | (2006.01) |
| G06F 9/44 | (2006.01) |
| H04L 12/42 | (2006.01) |
| H04L 12/40 | (2006.01) |

(52) U.S. Cl.
CPC ............. *G06F 13/42* (2013.01); *G06F 9/4411* (2013.01); *G06F 13/385* (2013.01); *G06F 13/426* (2013.01); *H04L 12/40006* (2013.01); *H04L 12/42* (2013.01); *H04L 2012/4028* (2013.01)

(58) Field of Classification Search
USPC ................................. 710/104–110, 305–311
See application file for complete search history.

(56) References Cited

U.S. PATENT DOCUMENTS

| | | | | | |
|---|---|---|---|---|---|
| 5,854,591 | A | * | 12/1998 | Atkinson | ............... H04L 12/403 348/E7.085 |
| 6,643,787 | B1 | * | 11/2003 | Zerbe | ........................ G06F 1/10 710/104 |

(Continued)

FOREIGN PATENT DOCUMENTS

| | | |
|---|---|---|
| EP | 2293429 A2 | 3/2011 |
| WO | 2009060153 A1 | 5/2009 |

OTHER PUBLICATIONS

Search Report and Written Opinion; Application FR 1202507; dated Mar. 19, 2013.

*Primary Examiner* — Raymond Phan
(74) *Attorney, Agent, or Firm* — Brooks Kushman P.C.

(57) ABSTRACT

A chained information exchange system (10) comprising a chain of modules (1, 2, 3, 4, 5), each module (1, 2, 3, 4, 5) being connected to one or two other modules (1, 2, 3, 4, 5) via digital buses (11, 12, 13, 14, 15), thereby forming a chain that is open or else a continuous loop that is closed. Each digital bus (11, 12, 13, 14, 15) is a hardened digital bus, capable of withstanding external electromagnetic disturbances, and it is unidirectional. A signal travels in said information exchange system (10) and consequently through each module (1, 2, 3, 4, 5), and after passing through a module (1, 2, 3, 4, 5), said signal contains information that the module (1, 2, 3, 4, 5) through which it has passed does not modify and that is addressed to at least one other module (1, 2, 3, 4, 5), together with specific information that has been added by said module (1, 2, 3, 4, 5) through which it has passed and that is addressed to at least one other module (1, 2, 3, 4, 5). Each module (1, 2, 3, 4, 5) includes at least one wired logic signal processor means (61) enabling said signal to pass through each module in a predetermined short length of time $T_r$.

16 Claims, 4 Drawing Sheets

(56) References Cited

U.S. PATENT DOCUMENTS

| | | | | |
|---|---|---|---|---|
| 8,423,823 B2* | 4/2013 | Venus | ............... | G06F 13/4256 712/31 |
| 2010/0122003 A1* | 5/2010 | Hu | ............... | H04B 10/60 710/110 |
| 2010/0250805 A1* | 9/2010 | Cohen | ............... | G06F 13/4004 710/110 |
| 2011/0200336 A1 | 8/2011 | Andreu | | |
| 2011/0210210 A1 | 9/2011 | Lebrun et al. | | |
| 2012/0166695 A1 | 6/2012 | Venus | | |
| 2013/0297829 A1* | 11/2013 | Berenbaum | ............... | G06F 13/4256 710/3 |

* cited by examiner

INFORMATION EXCHANGE SYSTEM COMPRISING A CHAIN OF MODULES CONNECTED TOGETHER BY HARDENED DIGITAL BUSES

CROSS REFERENCE TO RELATED APPLICATION

This application claims priority to FR 12 02507 filed on Sep. 21, 2012, the disclosure of which is incorporated in its entirety by reference herein.

BACKGROUND OF THE INVENTION (1) Field of the Invention

The present invention lies in the field of information exchange systems, and more particularly in the field of information exchange systems used in avionics systems that comply with aviation standards. The present invention relates to a chained information exchange system comprising a plurality of modules connected together by hardened digital buses.

(2) Description of Related Art

Present-day avionics information exchange systems serve to connect together the components making up the system, and to do so they make use of digital buses implemented using a variety of technologies. Such digital buses may be unidirectional or multidirectional, they may be point-to-point, single transmitter and multiple receiver, or indeed multipoint. Furthermore, such digital buses need to satisfy requirements that are specific to the field of aviation as specified in dedicated standards, e.g. in terms of withstanding electromagnetic waves.

Unidirectional buses are frequently encountered, i.e. buses in which an electric signal can travel in one direction only between the components that are connected together by such a bus. Conversely, multidirectional buses allow electric signals to travel in both directions between the components. There are two types of multidirectional bus, there are so-called "half-duplex" buses that enable an electric signal to travel in either direction along the bus, but in only one direction at a time, and there are also so-called "full-duplex" buses that allow electric signals to travel simultaneously in both directions along the bus.

It is necessary to have two unidirectional buses between two components in order to obtain information exchange that is equivalent to a "full-duplex" multidirectional bus.

There also exist single-transmitter multi-receiver digital buses capable of transmitting an electric signal solely from a single transmitter component to a plurality of receiver components. Conversely, a multipoint digital bus is capable of connecting together a plurality of components, each component being capable of being both a transmitter and a receiver. The capacities of the connections between a plurality of components, and consequently the exchange of information are therefore simpler to put into place with buses of this multipoint type.

Within electronic equipment, digital buses can be used for example to interconnect electronic chips over distances that are short, of the order of a few millimeters to a few centimeters. Generally, components in such equipment are protected, in particular against electromagnetic waves coming from external elements, by using the electronic equipment itself, e.g. by using a so-called "Faraday" cage.

Digital buses are also used for connecting together two such pieces of electronic equipment over distances that may lie in the range a few centimeters to several tens of meters.

Under such circumstances, in order to be capable of avoiding or at least minimizing the appearance of noise in the electric signal traveling over such a digital bus, the digital buses must also be capable of withstanding the external environment that might generate electromagnetic disturbances. Such digital buses incorporate protection against such disturbances. In the description below, such digital buses are referred to as "hardened digital buses" or more simply as "hardened buses".

By way of example, such electromagnetic disturbances may be generated by other wiring laid in the same bundle as the digital bus, by other pieces of electronic or electrical equipment close to the digital bus, and also by lightning. The protection of such hardened buses may be obtained merely by twisting together two electric wires, or else by shielding a bundle of electric wires and also by using filters on the interfaces with modules, these filters being constituted by one or more capacitors, together with inductors. Such hardened buses generally present impedance that is low, of the order of a few tens of ohms to a few kilohms, so as to be less sensitive to such electromagnetic disturbances.

The term "electronic equipment" is used to cover any peripheral or module that may be incorporated in an information exchange system and that is capable of receiving or of transmitting an electric signal. More particularly, the electronic equipment to which the invention applies comprises onboard modules, in particular modules on board aircraft, such as computers and actuators, for example.

The electric signal traveling along a digital bus conveys information that is exchanged between modules by being transferred over such digital buses. This information is encoded by bits capable of taking two values "1" and "0". The information may be encoded on a single bit, corresponding to two states of the signal. The voltage of the electric signal then switches between a first value, for which the bit is equal to "1", and a second value for which the bit is equal to "0".

The information may also be encoded on two bits, thereby corresponding to three states of the electric signal. The voltage of the electric signal then varies between a high value corresponding to the "1" state, in which the first bit is equal to "1", and the second bit is equal to "0", and a low state, generally a negative state, corresponding to the state "0", in which the first bit is equal to "0" and the second bit is equal to "1". In a third state for which the voltage of the electric signal is zero, the first and second bits are both equal to "0". This third state, corresponds to no information, but it may be used for example to detect a failure in the information exchange system. The two bits used for coding the signal may be referred to as "secondary signals".

This form of coding using two secondary signals is used on certain buses, e.g. after input decoding of bus buffers in application of the ARINC 429 standard that is used in the field of aviation.

In the description below, the term "signal" is used on its own to designate the electric signal conveyed by the digital buses. Similarly, the term "bus" is used more simply for designating digital buses.

The buses used in avionics information exchange systems may comply with standards that are specific to the field of aviation, such as the MIL 1553 or AFDX standards, which define multidirectional multipoint buses, or indeed the ARINC 429 standard, which defines single-transmitter, multi-receiver buses that are unidirectional.

Buses in compliance with the MIL 1553 standard are mainly used in militry applications, and buses in compliance with the AFDX standard also known as the ARINC 664 standard, which are based on the "Ethernet" bus, are used in commercial aircraft.

Those standards also define the data rates that can be conveyed by buses complying with those standards. Such data rates are characterized by the maximum number of bits that can be transmitted per second. The term "bandwidth" is used for designating this maximum information rate that characterizes a bus.

For example, multidirectional buses in compliance with the MIL 1553 standard have a bandwidth of 1 megabit per second (Mbps) and those in compliance with the AFDX standard have a bandwidth of 10 Mbps or 100 Mbps. In contrast, single-transmitter, multi-receiver buses that are monodirectional in compliance with the ARINC 429 standard have narrower bandwidths, of 12.5 kilobits per second (kbps) or of 100 kbps.

It is also possible to use buses in compliance with the RS422 standard, these buses being single-transmitter, multi-receiver, unidirectional buses with a bandwidth of up to 10 Mbps.

The performance of a bus is defined by these bus characteristics, whether they refer to bandwidth or to the fact that a bus is multidirectional or else unidirectional and single-transmitter, multi-receiver, or indeed multipoint. Buses in compliance with the MIL 1553 and AFDX standards are multidirectional buses with large bandwidth, and they provide higher performance than buses in compliance with the ARINC 429 standard, but they are also more expensive.

Nevertheless, a multidirectional and multipoint bus makes it possible to connect together a plurality of components and allows signals to pass between any pair of components in either direction. Each component is thus capable of exchanging information with any other component with which it is connected, i.e. it is capable both of sending information and of receiving it.

However, in a single-transmitter, multi-receiver, unidirectional bus it is possible to connect only one signal-transmitting component to a plurality of other components that are capable only of receiving the signal, with the signal being capable of passing between the components in one direction only from the transmitter component to the receiver components. Furthermore, if it is desired to have a plurality of transmitter components, then the number of unidirectional buses increases correspondingly, as does the number of inputs needed on each component. Such a configuration using single-transmitter, multi-receiver, unidirectional buses quickly becomes very complex and expensive, in spite of the low cost of the individual buses used.

Furthermore, such buses are limited in practice to the number of receivers that can be connected thereto. For example, a bus in compliance with the ARINC 429 standard, which in theory can use up to twenty receivers, is generally limited to four or five receivers. The protection provided against electromagnetic disturbance on such buses, and in particular the capacitors that are connected thereto, can lead to distortion in the signals passing through them, and the distortion can become excessive when the number of receivers increases.

Another known bus complies with the controller area network (CAN) standard, which is inexpensive and in widespread use in the automotive industry. Nevertheless, few components dedicated to that bus are qualified at present with respect to aviation standards. Its use in information exchange systems in the field of aviation remains very limited.

Likewise, test means suitable for validating such systems making use of CAN buses are still not widespread. The cost of such test means needs to be taken into account in the overall cost of such information exchange systems. In contrast, such test means already exist for systems using common buses such as buses in compliance with the ARINC 429 standard.

There also exist solutions for limiting the number of connections within equipment made up of a plurality of components. In the field of microprocessor systems, for example, peripherals are connected together in order to form an open chain or a closed loop. Such a configuration is commonly referred to as a "daisy chain".

Document US 2012/0166695 discloses an electronic system comprising a master module and a plurality of slave modules forming a daisy chain. A synchronization signal and a data signal are transmitted by the master module and they travel through each slave module before returning to the master module. The data signal transmitted by the master module may be of two types. In a first type of signal, the data signal contains common information for all of the slave modules, in which case none of the slave modules can modify the data signal. In a second type of signal, the data signal contains information addressed to a single slave module, which slave module can then modify the data signal in order to add information addressed solely to the master module. Each master or slave module may include a control unit such as a microprocessor, a microcontroller, or a field programmable gate array (FPGA), and these synchronizations and data signals may pass between the various modules over optical connections.

Document WO 2009/060153 describes avionics equipment for an aircraft that is capable of transmitting and receiving optical signals, together with an avionics system including at least one piece of such equipment. Such equipment includes an electro-optical connection interface capable of transforming both an optical signal into an electric signal and also an electric signal into an optical signal.

Finally, document EP 2 293 429 describes a secure monitoring and control device having an actuator control module and a monitoring module. The monitoring and control modules verify that the control signals and the signals from the sensors are consistent in order to control a module for powering the actuator.

BRIEF SUMMARY OF THE INVENTION

An object of the present invention is thus to propose an alternative to the above-mentioned information exchange systems and to provide a system for exchanging information between a plurality of modules, which system is inexpensive, requires few inputs and outputs at each module, and is qualified under aviation standards.

The invention provides an information exchange system comprising a chain of onboard modules provided with a first module, a last module, and at least one intermediate module. The first and last modules are connected respectively to at least one other module, whereas each intermediate module is connected to two other modules. Each module is connected to another module by a connection including at least one digital bus. The information exchange system includes a signal traveling in said chain and consequently through each module and over each digital bus.

The information exchange system is remarkable in that each bus is a hardened bus that withstands external electromagnetic disturbances. In addition, after passing through a module, the signal includes information that is not modified by the module passed through and that is addressed to at least one other module of the information exchange system, together with specific information that is added by the module being passed through and that is addressed to at least one other module of the information exchange system. The intermediate module in the chain includes at least one wired logic signal processor means enabling the electric signal to pass through each module in a predetermined short time $T_t$.

The distances between the various modules of the information exchange system may be considerable, lying in the range several centimeters to several hundreds of meters, in particular for modules on board aircraft. Such modules generally have their own devices for protecting them individually against electromagnetic disturbances. However, the buses connecting the modules together cannot be protected by the modules, since the lengths of the buses are too great.

The use of hardened buses between the modules of the information exchange system of the invention provides this protection against the external environment that is capable of generating electromagnetic disturbances on the signal passing over each of the buses. The use of a hardened bus thus makes it possible to avoid or to minimize the appearance of noise in the signal.

As mentioned above, the protection of such hardened buses may be obtained merely by twisting together two electric wires, or else by shielding a bundle of electric wires and using one or more capacitors. Such hardened buses generally present low impedance.

Advantageously, the modules of an information exchange system of the invention form a chain, with the ends of the chain being constituted by the first and last modules, each intermediate module lying between the first and last modules. Thus, the signal passes through each module of the chain and may include information for each module in the chain. Furthermore, the signal passes through each intermediate module.

It is possible to distinguish between an incoming signal to a module and an outgoing signal from the module. The signal may be modified on passing through a module so the incoming and outgoing signals can then be different.

Each module is capable of isolating from the incoming signal the information that is addressed to that module from information that is addressed to one or more other modules of the chain. Some of the information contained in the incoming signal, in particular the information addressed to one or more other modules of the chain, then does no more than pass through the module without being modified.

In addition, each module is capable of adding information specific to that module to the incoming signal, which information is addressed to one or more other modules of the chain. This information taken as a whole, i.e. the information that is not modified by the module plus the specific information that is added by the module and that is addressed to one or more other modules of the chain then constitutes the outgoing signal that is transmitted to the following module.

The signal can thus convey information between two modules while also passing through other modules. Likewise, the signal can convey information between each module of the information exchange system. In addition, this information exchange takes place in a single cycle of the signal passing through the information exchange system.

Nevertheless, it takes the signal a certain length of time to pass through a module, where this length of time is a function of the processing to which the signal is subjected in each module. As a result, information is then received with delay compared with the same signal if it had been transmitted directly between two specific modules.

In particular, if the modules through which the signal passes include programmed logic signal processor means, then the time taken to pass through a module may be long. That type of signal processor means includes at least one microprocessor that performs programmed operations in order to process the incoming signal as well as merely to transfer it. Those operations require in particular time to read the program(s) for execution plus the time for executing operations sequentially like a computer.

The time taken to pass through a module including programmed logic signal processor means may thus be of the order of several milliseconds.

By way of example, programmed logic signal processor means may comprise a microcontroller unit (MCU) or indeed a central processor unit (CPU).

Advantageously, each module through which the signal passes includes at least one wired logic signal processor means, thereby enabling the signal to pass through each module very quickly.

Wired logic signal processor means comprise various circuits such as logic and arithmetic operators, multiplexers, and demultiplexers, for example. This makes it possible to execute signal processing operations directly without involving programs. These operations are then executed more quickly. Furthermore, mere transfer of the signal is also faster since there is no need to involve a program, and this can be performed by one or more logic operators. As a result, the signal passes through each module in a length of time $T_t$ that is short and predetermined by the technology of the signal processor means, and thus with very little delay compared with a signal traveling directly between two modules. For example, this time to pass through a module may be as much as 0.4 milliseconds (ms) when the module includes at least one wired logic signal processor means.

The time taken by the signal to pass through a module may also be characterized as a function of a bit transfer speed, or more exactly of a word transfer speed, where a word is constituted by a plurality of bits, the number of said bits varying depending on the bus technology used, successive words also being separated by one or more bits, generally of value "0". Since the voltage of the signal varies as a function of the "0" or "1" values of each of the bits that are to be transmitted, the variation in this voltage imposes a minimum duration for transmitting each bit, and consequently each word. This word transmission duration is then longer than the time required for the signal to pass through a module, when the signal is not modified by the module.

For example, in a module in compliance with the ARINC 429 standard, a word is made up of thirty-two bits, with each word being separated by a zone without information that occupies four bits. This minimum duration for transmitting a word is then 0.36 ms with a bandwidth of 100 kbps.

Furthermore, a "frame" designates a set of one or more words making up the information conveyed by the signal. The use of wired logic signal processor means enables the signal to pass through each module in a predetermined short length of time $T_t$, which is then much less than the time generally required for transmitting a frame.

The wired logic signal processor means of a module may be made up of various kinds of electronic elements.

For example, it may be constituted by an FPGA or by a complex programmable logic device (CPLD).

The wired logic signal processor means may also be constituted by an application specific integrated circuit (ASIC).

Furthermore, each module is connected to another module by a connection that includes at least one digital bus. Advantageously, each connection between two modules may comprise a single hardened digital bus. A module that is connected to two modules via two respective buses need have only one input and one output. Likewise, a module that is connected to only one other module via a single bus need have only one input or else only one output.

Furthermore, the first and the last modules are connected respectively to at least one other module, and each intermediate module is connected to two other modules, with the set of modules in the information exchange system thus forming the chain of modules. Thus, the signal passes along the chain and consequently through each of the modules of the information system.

Using a chain of modules makes it possible to limit the number of buses and also the number of inputs and outputs at each module, while nevertheless enabling the signal to pass through each module. This number of buses is equivalent to the number of buses needed in a conventional information exchange system, e.g. having a star configuration, in which one module is connected to all of the other modules. The information exchange system of the invention advantageously enables the signal to pass through each module, even though that is not true of a star configuration system, in which a single module is connected to each of the other modules. In order to obtain equivalent operation, it is then necessary to add buses between the other modules of the star system and also to add at least one input and at least one output to each module.

Furthermore, the limited number of buses and the limited number of inputs and outputs at each module in the information exchange system of the invention also make it possible to simplify the design, the provision, and the maintenance of such information exchange systems. Consequently, the costs of design, manufacture, and maintenance for such an information exchange system are reduced.

Nevertheless, in order to make the information exchange system secure, each connection between two modules may comprise two hardened digital buses that are installed in parallel with each other, and consequently each intermediate module has two inputs and two outputs, while a module that is connected to only one other module need have only two inputs or only two outputs.

Such an information exchange system then has a larger number of buses, of inputs, and of outputs, but the transmission of the signal through the system is ensured, even in the event of one of the buses failing.

The operation of the information exchange system of the invention thus enables information to be exchanged rapidly between each of the modules of the system, while limiting the number of buses connecting the modules together and limiting the numbers of inputs and outputs at each module.

In an embodiment of the invention, the first and last modules are respectively connected to one other module only, an intermediate module, with the chain of modules then forming an open chain. Thereafter, the signal passes along this open chain, and consequently through each module in the information exchange system.

In another embodiment, the first and last modules are each connected to two other modules, firstly they are connected to each other and secondly they are connected to respective intermediate modules. The chain of modules is then closed so as to form a continuous loop that is closed. The electric signal then passes around the continuous, closed loop and consequently passes through each module, including the first and last modules. In order to benefit likewise from a predetermined short time for passing through the first and last modules, the first and last modules should respectively include at least one wired logic signal processor means.

In addition, the information exchange system of the invention, regardless of whether it has a loop that is continuous and closed or a chain that is open, may also include control means for the purpose in particular of initiating exchanges of information between the modules and also for triggering the passage of the electric signal.

One of the modules of the information exchange system preferably constitutes such control means.

The information exchange system of the invention may also include one or more additional characteristics.

In an embodiment of the invention, the buses providing connections between pairs of modules are unidirectional buses. Since unidirectional buses are less expensive than multidirectional buses, the cost of the information exchange system of the invention is thus reduced.

With an open chain, the signal passes for example from the first module to the last module and thus through each of the modules. The first module can thus deliver information to each of the modules in the open chain, i.e. to all of the intermediate modules and to the last module. Similarly, each intermediate module can deliver information only to one or more other modules that are located downstream therefrom in the direction in which the signal travels. Thus, the last module can only receive information from the other modules in the open chain, without it being possible for it to deliver any information to them. Such an open chain system is thus well adapted when one module delivers information to a plurality of other modules or when one module receives information from a plurality of other modules.

In contrast, if a module needs to deliver information to another module located upstream in the signal travel direction, such an open chain system made up of unidirectional buses is not appropriate. By way of example, it is then necessary to enable the signal to travel in both directions, either by using multidirectional buses, but with the associated extra cost, or else by putting each unidirectional bus in parallel with another unidirectional bus in the opposite direction. Either way, the cost of the information exchange system increases, either by using multidirectional buses, or by doubling the number of unidirectional buses and the numbers of inputs and outputs at each module.

Advantageously, the exchange system of the invention enables that problem to be solved merely by adding a single unidirectional bus between the last module and the first module, thereby transforming the open chain system into an information exchange system having a loop that is continuous and closed.

With the signal always traveling in the same direction, a module can deliver information to any other module in the loop, including those situated upstream from that module, i.e. ahead of said module in the signal travel direction. This procures operation that is equivalent to that of a multidirectional information exchange system even though the system makes use of unidirectional buses only between each of the modules. As a result, the cost of such a system remains reasonable, while nevertheless enabling high performance to be achieved, with each module passing the signal in a predetermined short time $T_t$ and rapidly receiving any information from any other module in the continuous, closed loop.

In an embodiment of the invention, the unidirectional buses are buses in compliance with the ARINC 429 standard. In order to be used in the field of aviation, the information exchange system must make use of elements that comply with the requirements of this field, and this is true of the ARINC 429 standard. Furthermore, the buses complying with that standard are inexpensive and thus enable the cost of the information exchange system to be limited.

In addition, test means already exist for such buses that are suitable for validating and maintaining such systems. There is no need to take specific test means into account when calculating the overall cost of such an information exchange system.

It is also possible to use unidirectional buses in compliance with the RS422 standard.

With a loop that is continuous and closed, it is possible for one of the modules of the information exchange system to be a main module and for it to transmit information to all of the other modules which are then secondary modules. However, the secondary modules transmit information only to the main module. The main module is preferably the means for controlling the continuous and closed loop. Furthermore, the information is transmitted between the main module and the secondary modules during each cycle of the signal traveling through the information exchange system.

Under such circumstances, the signal has a main portion and a secondary portion. The main portion contains the information sent by the main module and addressed to the secondary module, while the secondary portion contains the information sent by each secondary module and addressed to the main module. As the signal passes through each secondary module, the secondary module can add its own specific information to the secondary portion of the signal. For this purpose, the secondary portion has respective zones dedicated to each secondary module. The zones in the secondary portion of the incoming signal that are dedicated to other secondary modules and that have information specific thereto are left unchanged by the module through which the signal is passing. Likewise, the main portion of the signal is left unchanged when the signal passes through each secondary module.

In a preferred embodiment of the invention, the main module of the information exchange system comprises control means, such as a computer of an autopilot of an aircraft, whereas the secondary modules are peripherals of the computer, such as actuators connected to control axes of the aircraft. The control means deliver control information to the peripherals that constitute the main portion of the signal, and the peripherals deliver information about their respective states to the control means, this information constituting the secondary portion of the signal. By way of example, the control information may be constituted by the positions or the speeds that each actuator is to take up, whereas the state information from each actuator that is transmitted to the computer is constituted by the actual position of the actuator, the force it is exerting on the control surfaces, and its operating state.

For example, such an information exchange system may have four actuators, corresponding respectively to the pitch, yaw, and roll axes, and also to controlling the collective pitch of the blades of the main rotor of a rotary wing aircraft.

In a first embodiment of a peripheral of the system of the invention, the peripheral includes wired logic signal processor means, receiver means, transmitter means, and two OR logic gates. The receiver means receive the incoming signal and transform it into an incoming logic signal containing the same information as the incoming signal. The wired logic signal processor means operate on a logic signal which is different from the signal traveling on a bus.

The wired logic signal processor means then analyze the incoming logic signal, isolating therefrom the main portion and acting as a function of information in the main portion. The wired logic signal processor means then transmit the information specific to the associated peripheral in the form of an additional logic signal. This specific information may for example come from sensors present in the peripheral and may contain its position, the force it is exerting, and its state.

Simultaneously, the incoming logic signal passes through the peripheral to the OR logic gates. The specific information contained in the additional logic signal is then added to the secondary portion of the incoming logic signal in the zone that is dedicated to this particular peripheral by means of these two OR logic gates that thus form an outgoing logic signal.

The peripheral has two OR logic gates since, as mentioned above, the incoming signal may be subdivided into two secondary signals. Under such circumstances, the incoming logic signal is also subdivided into two secondary logic signals. Nevertheless, for simplification purposes, the description below relates to a signal, it being understood that it might be made up of two secondary signals.

Finally, the outgoing logic signal is transformed by the transmitter means into an outgoing signal for transmission to the following module over the output bus.

Furthermore, the incoming signal is deformed to a small extent on passing through the peripheral. The transformations performed by the receiver means and by the transmitter means of the peripheral can lead to low levels of distortion in the incoming signal, which distortion is then forwarded in the outgoing signal.

These transformations may also give rise to a delay in the signal compared with a signal going directly from a transmitter module to a receiver module via a single bus, with it nevertheless being possible for this delay to be minimized by using wired logic signal processor means. The delay obtained after this passage through such a peripheral may be of the order of 0.75 microseconds ($\mu$s), for example. As a result, for an information exchange system having four peripherals, the control means will receive information from the four peripherals with a delay of about 2.25 $\mu$s.

In a second embodiment of a peripheral in an information exchange system, a peripheral has wired logic signal processor means, receiver means, transmitter means, and a changeover switch. The receiver means receive the incoming signal and transform it into an incoming logic signal that contains the same information as the incoming signal.

The wired logic signal processor means then analyze the incoming logic signal, isolating the main portion and acting as a function of the information in the main portion. Thereafter, the wired logic signal processor means transmit information specific to the peripheral in question in the form of an additional logic signal.

The additional logic signal is then transformed by the transmitter means into an additional signal that is then sent to the terminals of the switches.

In parallel, the incoming signal is also sent directly to other terminals of the switch without passing via the receiver means. As above, the peripheral has two switches, since each signal may comprise two secondary signals.

The information specific to the peripheral in question, contained in the additional signal, is then added to the secondary portion of the incoming signal via the switch. The switch is controlled by the wired logic signal processor means so as to add this specific information in the zone dedicated to this peripheral in the secondary portion of the incoming signal, thereby forming the outgoing signal, suitable for transmission to the following module via the output bus.

Under such circumstances, the incoming signal passes through the peripheral without passing through the receiver means and the transmitter means of the peripheral. As a result, the signal is slowed down very little if at all. Likewise, the signal is subjected to little distortion. However, the switch in the peripheral constitutes the output interface of the peripheral and needs to comply with aviation requirements, in particular in terms of withstanding electromagnetic waves.

In a third embodiment of a peripheral of the system, a peripheral includes wired logic signal processor means, receiver means, and transmitter means, the wired logic signal processor means also including synchronizer means.

The wired logic signal processor means then analyze the incoming logic signal, isolating the main portion therefrom and acting as a function of the information in the main portion. Thereafter, the synchronizer means transmit an outgoing logic signal by adding an additional logic signal to the incoming logic signal, which additional logic signal includes the information specific to this particular peripheral. This specific information is placed in the zone dedicated to the peripheral in the secondary portion.

Finally, the outgoing logic signal is transformed by the signal transmission means into an outgoing signal for transmission to the following module via the output bus.

Advantageously, prior to transmitting the outgoing logic signal, the synchronizer means serve to correct the distortions that the incoming signal might have suffered on passing through the peripheral. The outgoing signal is therefore subjected to little distortion, since it is subjected only to the transformation of the transmitter means. However, the time required for the incoming signal to pass through the synchronizer means slow the signal down and give rise to a longer delay. This delay may be of the order of 0.36 ms, for example.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE INVENTION

Figure 1:
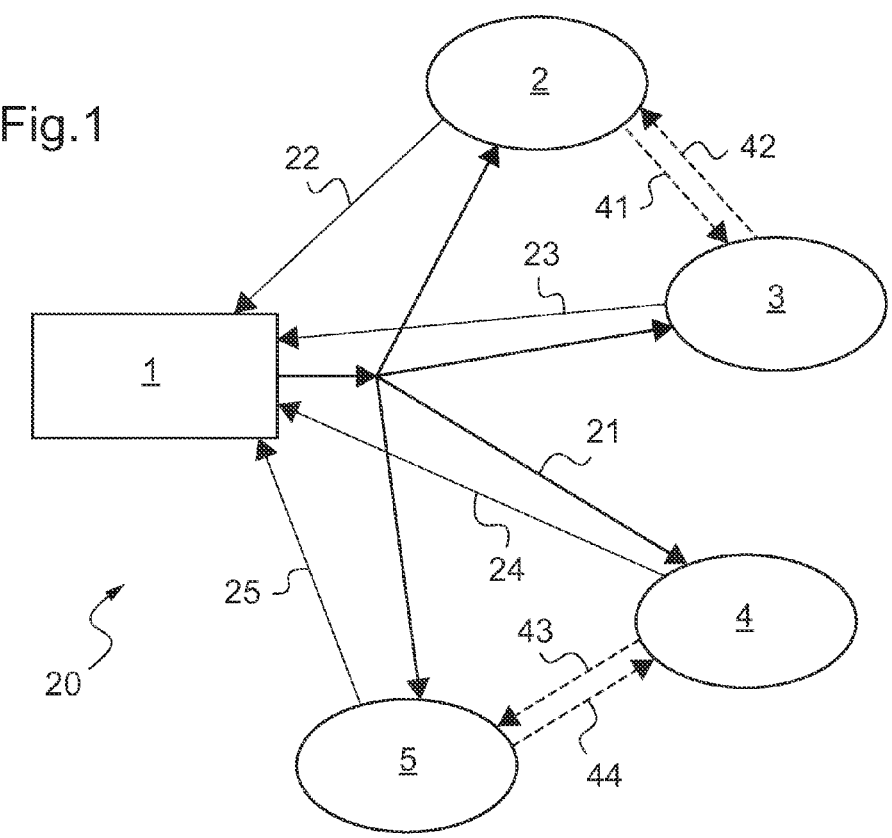
FIG. 1 is a diagram of an information exchange system as conventionally used.

FIG. 1 shows a conventional information exchange system 20 comprising a main module 1 and four secondary modules 2, 3, 4, 5.

The main module 1 can transmit information to each of the secondary modules 2, 3, 4, 5 via a bus 21. This bus 21 is a single-transmitter, multi-receiver bus and it is unidirectional. In order to enable each secondary module 2, 3, 4, 5 to transmit information to the main module 1, each secondary module 2, 3, 4, 5 is also connected to the main module 1 via a respective bus 22, 23, 24, 25, each of which buses is also unidirectional.

This thus obtains a multidirectional information exchange system between the main module 1 and each secondary module 2, 3, 4, 5. However, the main module 1 in this multidirectional information exchange system 20 needs to have at least four inputs and one output for connection to the corresponding buses.

As shown in FIG. 1, it is also possible to add buses between some of the secondary modules 2, 3, 4, 5 so as to enable them to exchange information directly between one another. For example, buses 41, 42 are installed between the secondary modules 2 and 3, and buses 43, 44 are installed between the secondary modules 4 and 5. Such a system then has four additional buses, but does not enable exchanges to take place between any two modules, for example there is no bus interconnecting the secondary modules 3 and 4. Furthermore, certain secondary modules need to have two inputs and two outputs for connecting to corresponding buses in order to enable information to be exchanged both with the main module and with some other secondary module.

Figure 2:
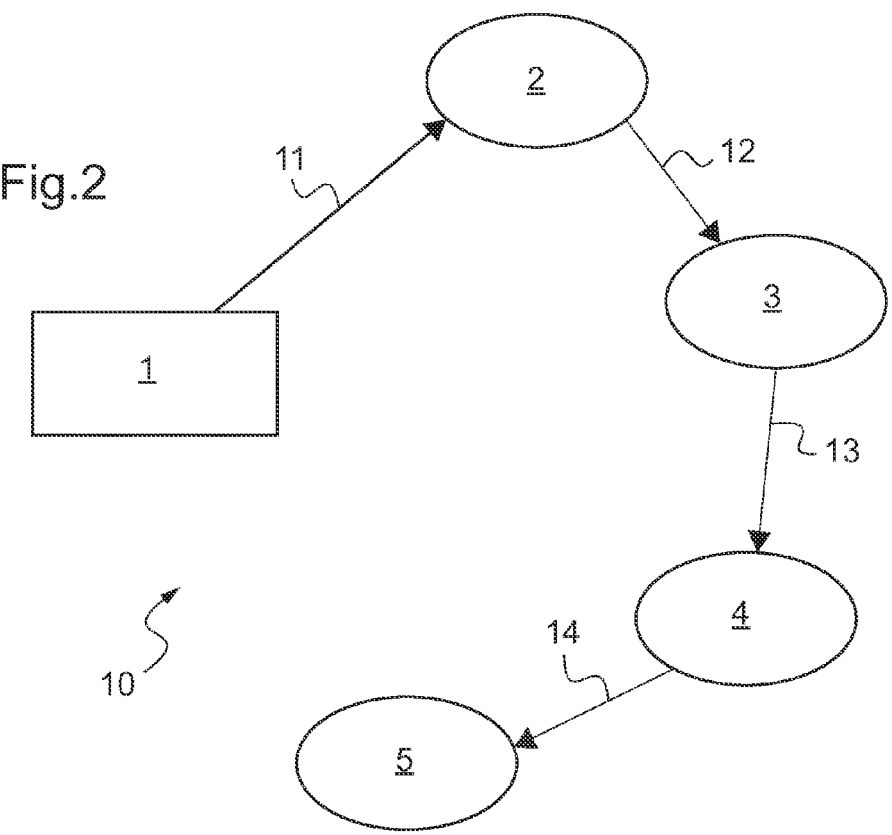
FIGS. 2 to 4 are three diagrams of embodiments of an information exchange system of the invention.

FIG. 2 shows an embodiment of an information exchange system 10 of the invention having five modules 1, 2, 3, 4, and 5. Nevertheless, an information exchange system 10 of the invention is not limited to this particular embodiment and it may have some other number of modules.

A main module 1 is connected to a single secondary module 2 via a unidirectional bus 11. Likewise each secondary module 2, 3, 4 is connected respectively to the secondary module 3, 4, 5 via respective unidirectional buses 12, 13, 14. An open chain beginning with the main module 1 and terminating with the secondary module 5 in the signal travel direction is thus formed by the set of modules 1, 2, 3, 4, and 5 and by the buses 11, 12, 13, 14. Consequently, the main module 1 and the secondary module 5, constituting the ends of the open chain, have a single output or else a single input, whereas all of the other secondary modules 2, 3, 4 have both an input and an output.

Thus, a signal can travel in a single direction in this open chain and in sequence through each of the modules 1, 2, 3, 4, and 5, since they are connected together by unidirectional buses 11, 12, 13, and 14.

Furthermore, the information exchange system 10 may have means for controlling the open chain, in particular in order to initiate exchanges of information between the modules 1, 2, 3, 4, and 5, and to cause the electric signal to pass. Since the signal travels in one direction only, the main module 1 in this information exchange system 10 constitutes the means for controlling the open chain.

Figure 3:
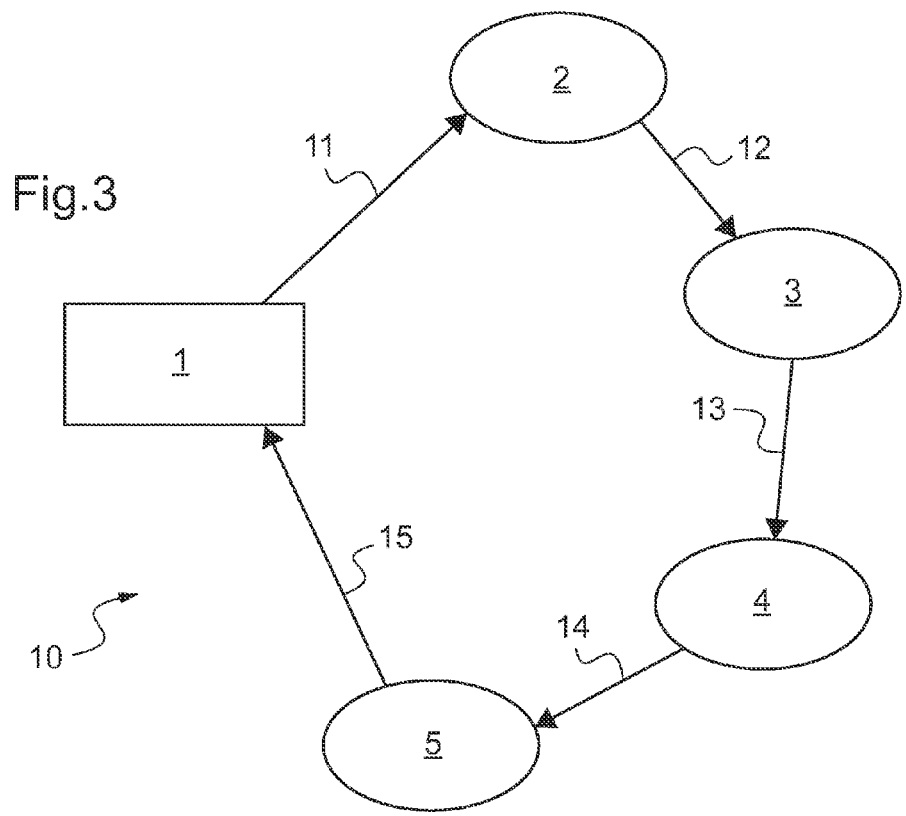

FIG. 3 shows another embodiment of the information exchange system 10 of the invention having five modules 1, 2, 3, 4, and 5.

Each module 1, 2, 3, 4, and 5 is connected to two other modules prior to respective buses. Thus, the main module 1 is connected to the first secondary module 2 by a unidirectional bus 11. This bus 11 constitutes the output bus from the main module 1 and the input bus of the first secondary module 2. This first secondary module 2 is itself connected to a second secondary module 3 by another unidirectional bus 12. Similarly, each secondary module is connected to the following secondary module by a respective unidirectional bus. The last secondary module 5 is also connected to the main module 1 by a last unidirectional bus 15, which constitutes the input bus for the main module 1. As a result, the main module 1 and also each of the secondary modules 2, 3, 4, and 5 has a single input and a single output.

The set of modules 1, 2, 3, 4, and 5 together with the buses 11, 12, 13, 14, and 15 forms a continuous loop that is closed. A signal can travel in one direction only along this continuous, closed loop, with the modules 1, 2, 3, 4, and 5 being connected together by unidirectional buses 11, 12, 13, 14, and 15. As a result, the signal passes through each module 1, 2, 3, 4, and 5.

Furthermore, the information exchange system 10 could have control means for controlling the continuous, closed loop, in particular for the purpose of initiating the exchanged information between the modules 1, 2, 3, 4, and 5 and also for triggering the passage of the electric signal.

The main module 1 of this information exchange system 10 preferably constitutes the means for controlling the continuous, closed loop.

Figure 4:
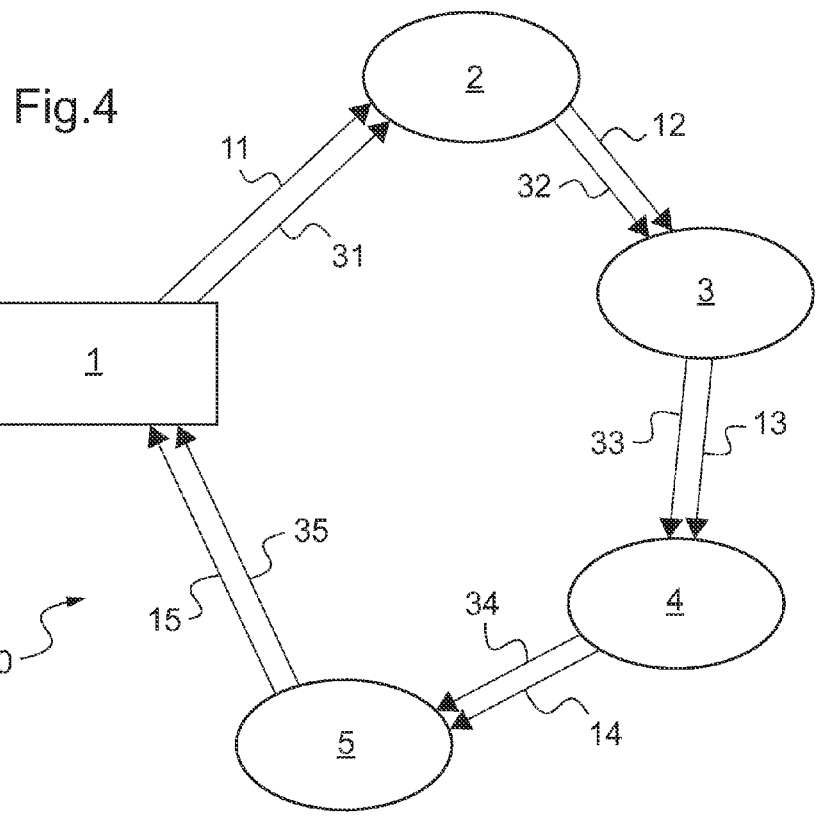

FIG. 4 shows a variant embodiment of the information exchange system 10 shown in FIG. 3. Such an information exchange system 10 has five modules 1, 2, 3, 4, and 5 that co-operate with the buses 11, 12, 13, 14, and 15 to form a first continuous, closed loop. A second continuous, closed loop is formed by the set of modules 1, 2, 3, 4, and 5 and by buses 31, 32, 33, 34, and 35, where each bus 31, 32, 33, 34, and 35 is arranged in parallel with a respective one of the buses 11, 12, 13, 14, and 15.

A signal can thus travel firstly in the first continuous, closed loop, and secondly in the second continuous, closed loop, and consequently it can pass each module 1, 2, 3, 4, and 5. Thus, in the event of any one of the buses 11, 12, 13, 14, and 15 in the first continuous, closed loop failing, the second continuous, closed loop makes it possible to pass the signal, and consequently to enable the information exchange system 10 to operate.

Furthermore, this signal passing through the information exchange system 10 may also include information for each of the modules 1, 2, 3, 4, and 5. When the signal passes through each of the modules 1, 2, 3, 4, and 5, that module is capable of analyzing and isolating information addressed thereto from all of the information contained in the signal. The information contained in the signal and addressed to other modules 1, 2, 3, 4, or 5 of the information exchange system 10 then merely pass through said module.

Furthermore, each module 1, 2, 3, 4, and 5 of the information exchange system 10 can add information specific to that module and addressed to one or more other modules.

In the signal, it is thus possible to distinguish between an incoming signal entering a module and an outgoing signal leaving that module. Since the signal can be modified on passing through a module, the incoming signal and the outgoing signal may be different.

Figure 5:
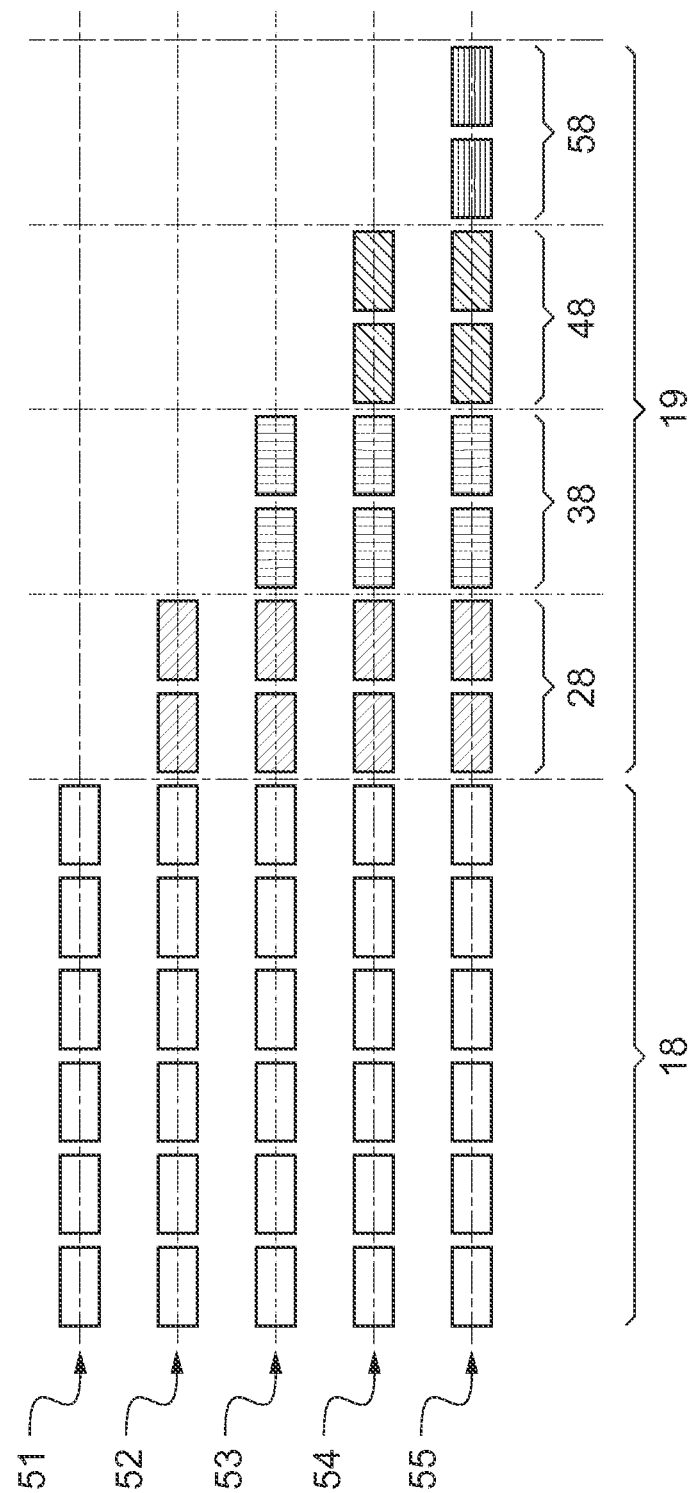
FIG. 5 represents an electrical signal conveyed in the information exchange system.

FIG. 5 shows an example of a signal capable of passing through the information exchange system 10 as described with reference to FIG. 2, 3, or 4. In this information exchange system 10, it is considered that there is a main module 1 and four secondary modules 2, 3, 4, and 5.

FIG. 5 shows how the signal varies as it progresses around the continuous, closed loop, and at each output from one of the modules 1, 2, 3, 4, and 5 of the information exchange system 10. In this example, the signal has a main portion 18 comprising information from the main module 1 addressed to all of the secondary modules 2, 3, 4, and 5, together with a secondary portion 19 comprising information from each secondary module 2, 3, 4, and 5 that is addressed to the main module 1.

The signal 51 represents the signal output from the main module 1, and thus the signal input into the first secondary module 2. The signal 51 has information in the main portion 18, whereas its secondary portion 19 is empty, since it comprises four zones 23, 38, 48, and 58 dedicated respectively to each of the secondary modules 2, 3, 4, and 5.

This main portion 18 of the signal 51 is analyzed by the first secondary module 2, which can act as a function of the information in this main portion 18. The signal 51 also passes through this first secondary module 2 without this main portion 18 being modified, whereas the first secondary module 2 may add specific information addressed to the main module 1 to the dedicated zone 28 of the secondary portion 19. The unmodified main portion 18 and the secondary portion 19 including this specific information then constitutes the signal 52 output by the first module 2 and traveling over the bus 12 to the second secondary module 3.

Thereafter, the second secondary module 3 analyses the signal 52 and acts as a function of the information in the main portion 18 of the signal 52. The signal 52 also passes through this second secondary module 3 without this main portion 18 being modified and without the dedicated zone 28 of the secondary portion 19 being modified. However the second secondary module 3 may then add information addressed to the main module 1 to the dedicated zone 38 of the secondary portion 19 of the signal 52. The unmodified main portion 18 together with the secondary portion 19 comprising the specific information from the first secondary module 2 and the specific information from the second secondary module 3 make up the signal 53 output from the second secondary module 3 and traveling over the bus 13 to the third secondary module 4.

Likewise, the signal 54 leaving the third secondary module 4 and traveling over the bus 14 to the fourth secondary module 5 comprises the unmodified main portion 18 together with a secondary portion 19 comprising the dedicated zone 28 and 38 in unchanged form plus the dedicated zone 48 as filled in with specific information from the third secondary module 4 addressed to the main module 1.

Finally, the signal 55 output by the fourth secondary module 5 and traveling over the bus 15 to the main module 1 comprises the unmodified main portion 18 together with the secondary portion 19 now comprising the dedicated zones 28, 38, and 48 plus the dedicated zone 58 as filled in with specific information from the fourth secondary module 5 and addressed to the main module 1.

Thus, the main module 1 receives the signal 55 that includes the information from each of the secondary modules 2, 3, 4, and 5 located in respective ones of the dedicated zones 28, 38, 48, and 58 of the secondary portion 19 of the signal 55.

Figure 6:
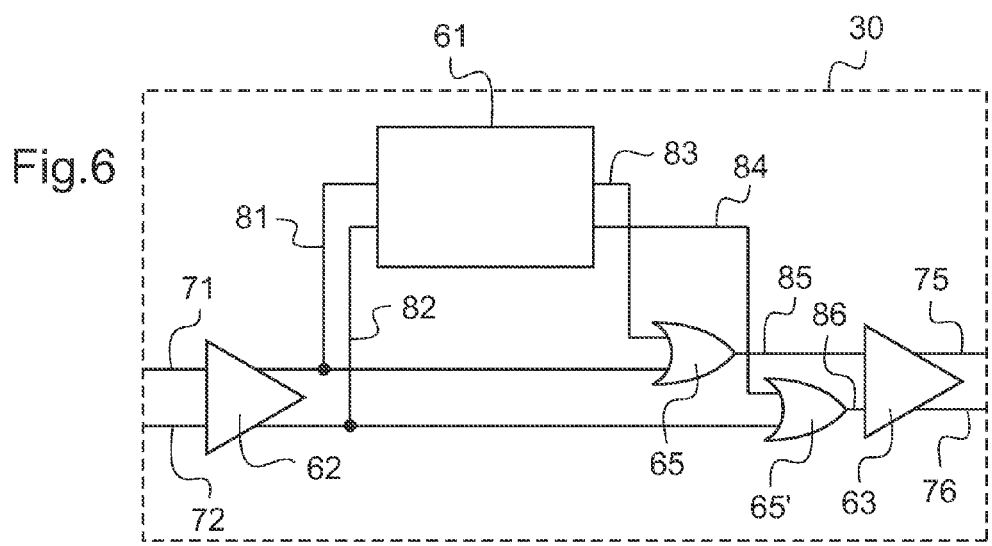
FIGS. 6 to 8 are functional diagrams of three embodiments of a peripheral of the information exchange system.
Figure 7:
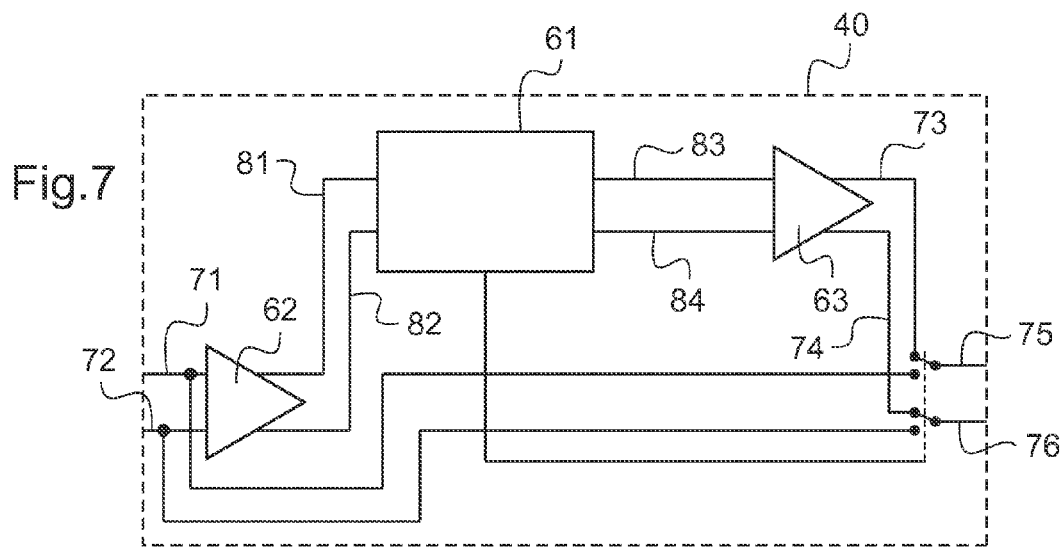
Figure 8:
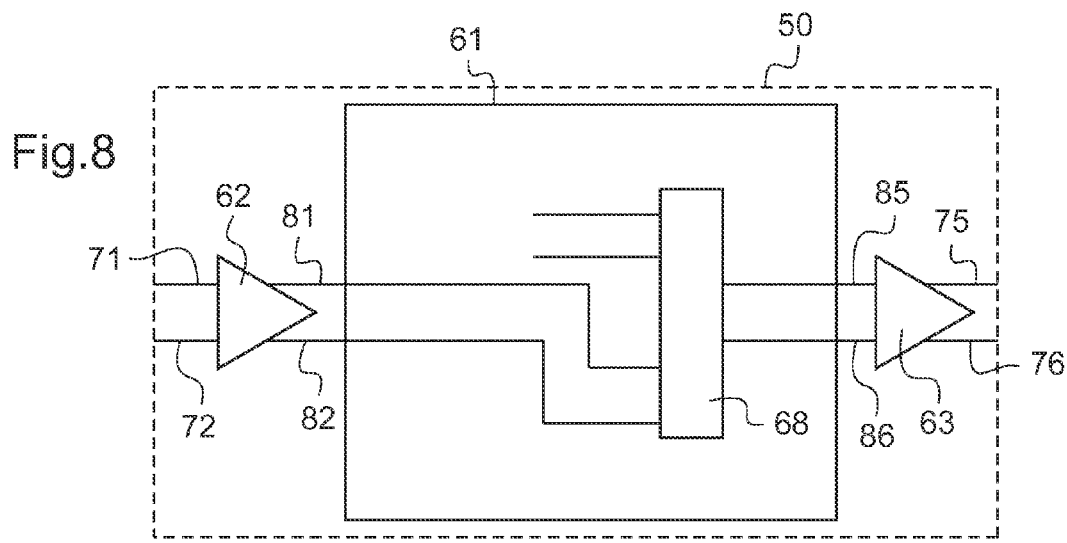

FIGS. 6 to 8 show three embodiments of a secondary module 30, 40, and 50.

Each secondary module 30, 40, 50 comprises receiver means 62 whereby each module 30, 40, 50 transforms the signal traveling along the continuous, closed loop into a logic signal that can be used by the wired logic signal processor means 61. As mentioned above, the signal may be subdivided into two secondary signals.

In the first embodiment shown in FIG. 6, each incoming secondary signal 71, 72 is transformed into an incoming secondary logic signal 81, 82 by the receiver means 62, and is then directed to the wired logic signal processor means 61 so that the module 30 can act as a function of the information in the signal that is addressed thereto. Simultaneously, each incoming secondary logic signal 81, 82 passes through this module 30 to one of the inputs of a respective OR logic gate 65, 65'. This module 30 has two OR logic gates 65, 65', one OR logic gate 65 for the incoming secondary logic signal 81 and another OR logic gate 65' for the incoming secondary logic signal 82.

The second input of each of the OR logic gates 65, 65' is connected to a respective output from the wired logic signal processor means 61 via which it receives a respective additional secondary logic signal 83, 84 containing information addressed to at least one other module of the information exchange system 10. The OR gates 65, 65' thus enable each additional secondary logic signal 83, 84 to be added to each incoming secondary logic signal 81, 82 so as to form two outgoing secondary logic signals 85, 86. At the outputs from these OR gates 65, 65', the two outgoing secondary logic signals 85, 86 then contain the information contained in the incoming signal and addressed to the other modules of the information exchange system 10, together with the information from the module 30 that is addressed to those other modules.

Thereafter, the outgoing secondary logic signals 85, 86 are transformed by transmitter means 63 into outgoing secondary signals 75, 76 in order to be transmitted to the following module of the information exchange system 10.

The signal made up of two secondary signals thus passes quickly through each module. The signal reaches each module of the information exchange system 10 with a predetermined short delay relative to a signal traveling directly between two modules. In this first embodiment, only the transformations of the incoming secondary signals 71, 72 into incoming secondary logic signals 81, 82 by the receiver means 62, and the transformations of the outgoing secondary logic signals 85, 86 into outgoing secondary logic signals 75, 76 by the receiver means 62 slow down the passage of these secondary signals. Furthermore, these transformations can also generate a small amount of distortion in the signal. The predetermined short delay in the signal on passing through this first embodiment is of the order of 0.75 µs.

The wired logic signal processor means 61 in such a secondary module may be constituted by various electronic elements.

For example, the wired logic signal processor means 61 may be constituted by a FPGA or by a CPLD, or indeed by an ASIC.

In the second embodiment shown in FIG. 7, each incoming secondary signal 71, 72 is transformed into an incoming secondary logic signal 81, 82 by the receiver means 62, and is then directed to the wired logic signal processor means 61 so that the module 40 acts as a function of the information in the signal that is addressed thereto. Simultaneously, each incoming secondary signal 71, 72 passes directly through the module 40 without passing through the receiver means 62 to a respective changeover switch 64, 64'. The module 40 has two changeover switches 64, 64', with a first input of each changeover switch 64, 64' being connected to a respective incoming secondary signal 71, 72.

Each second input of each changeover switch 64, 64' is connected to a respective output of transmitter means 63. Unlike the first embodiment of FIG. 6, the transmitter means 63 in this embodiment are placed directly at the output from the wired logic signal processor means 61. The transmitter means 63 transform the additional logic signals 83, 84 as delivered by the wired logic signal processor means 61 into additional secondary signals 73, 74 that then contain the information specific to the module 40 and addressed to at least one other module in the information exchange system 10.

Thereafter, the switches 64, 64' are controlled by the wired logic signal processor means 61, so as to changeover at the appropriate moment in order to add the additional secondary signals 73, 74 to the incoming secondary signals 71, 72. This produces the outgoing secondary signals 75, 76. These outgoing secondary signals 75, 76 contain the information specific to this module 40 that is addressed to other modules of the information exchange system 10, together with the information already contained in the signal incoming into this module 40 and addressed to the other modules.

Thus, each outgoing secondary signal 75, 76 is transmitted to the following module of the information exchange system 10.

In this second embodiment, the signal passes through each module more quickly than in the first embodiment. The incoming secondary signals 71, 72 are forwarded directly to the switches 64, 64' without being subjected to any transformation. The signal thus passes through this module 40 while being subjected to practically no delay and to little distortion.

In the third embodiment shown in FIG. 8, each incoming secondary signal 71, 72 is transformed into an incoming secondary logic signal 81, 82 by the receiver means 62, and is then directed towards the wired logic signal processor means 61 so that the module 50 acts as a function of the information in the signal that is addressed thereto.

The wired logic signal processor means 61 include synchronizer means 68 that deliver the outgoing secondary logic signals 85, 86. The synchronizer means 68 are capable of grouping together firstly the information from the module 50 that is addressed to the other modules of the information exchange system 10, and secondly the information contained in the incoming signals to this module 50 in order to form the outgoing secondary signals 85, 86.

The synchronizer means 68 are also capable of forwarding the outgoing secondary logic signals 85, 86 and new secondary logic signals. Consequently, the outgoing secondary logic signals 85, 86, equivalent to new secondary signals are subjected to no distortion.

Thereafter, these outgoing secondary signals 85, 86 are transformed by transmitter means 63 into outgoing secondary signals 75, 76 so as to be transmitted to the following module of the information exchange system 10.

The outgoing secondary signals 75, 76 are subjected to only one transformation by the transmitter means 63 after the outgoing secondary logic signals 85, 86 have been delivered by the synchronizer means 68. They are therefore subjected to very little distortion. In contrast, passing through the wired logic signal processor means 61 and the synchronizer means 68 included therein slows down the secondary signals considerably, giving a longer delay of about 0.36 ms.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An information exchange system comprising a chain of onboard modules provided with a first module, a last module, and at least two intermediate modules, the first and last modules being connected respectively to at least one other module, each intermediate module being connected to two other modules, each module being connected to another module by a connection including at least one digital bus, the system including an electric signal traveling along the chain and consequently through each module and each digital bus;

wherein:
- each module is configured to add information specific to that module to the electric signal as the signal passes through that module irrespective of whether any of the other modules have added information specific to those other modules to the signal as the signal passed through those other modules;
- each digital bus is a hardened digital bus that withstands external electromagnetic disturbances;
- after passing through a module, the electric signal contains information that has not been modified by the module through which the signal has passed and addressed to at least one other module of the system, together with information specific to the module added by the module through which the signal has passed and addressed to at least one other module of the system; and
- each intermediate module includes at least one wired logic signal processor means enabling the signal to pass through each intermediate module in a predetermined short time $T_t$.

2. The information exchange system according to claim 1, wherein each connection between two modules includes two digital buses.

3. The information exchange system according to claim 1, wherein each digital bus is a unidirectional bus.

4. The information exchange system according to claim 1, wherein one of the modules constitutes control means for the information exchange system, enabling information exchange to be initiated between the modules and enabling the passage of the electric signal to be triggered.

5. The information exchange system according to claim 1, wherein the first and last modules are each connected to a single module, so that the information exchange system thus forms an open chain.

6. The information exchange system according to claim 1, wherein the first and last modules are each connected to two modules, the information exchange system thus forming a continuous loop that is closed, the first module and the last module respectively including at least one wired logic signal processor means.

7. The information exchange system according to claim 3, wherein each digital bus is a digital bus complying with the ARINC 429 standard.

8. The information exchange system according to claim 6, wherein one of the modules is a main module and the other modules are secondary modules, the electric signal comprising firstly a common main portion delivered by the main module and addressed to each secondary module, and secondly a secondary portion in which each secondary module can add information that is specific to the secondary module.

9. The information exchange system according to claim 8, wherein the secondary portion includes a zone dedicated to each secondary module.

10. The information exchange system according to claim 8, wherein at least one secondary module includes wired logic signal processor means receiver means, transmitter means, and two OR logic gates, the OR logic gates enabling the information specific to the secondary module to be added to the secondary portion prior to the transmitter means transmitting the electric signal to the following secondary module.

11. The information exchange system according to claim 8, wherein at least one secondary module includes wired logic signal processor means, receiver means, transmitter means, and a changeover switch, the switch being controlled by the wired logic signal processor means and enabling the information specific to the secondary module to be added to the secondary portion after the specific information has been transmitted by the transmitter means and before transmission to the following secondary module.

12. The information exchange system according to claim 8, wherein at least one secondary module includes wired logic signal processor means, receiver means, and transmitter means, the wired logic signal processor means including synchronizer means suitable for issuing an electric signal comprising firstly the main portion and secondly the secondary portion as modified by adding the information specific to the secondary module, after which the transmitter means transmit the electric signal to the following secondary module.

13. The information exchange system according to claim 8, wherein the system has four secondary modules.

14. The information exchange system according to claim 8, wherein the main module is a computer of an aircraft autopilot and the secondary modules are actuators for actuating control axes of the aircraft.

15. An information exchange system comprising:
a chain of onboard modules provided with a first module, a last module, and at least one intermediate module, the first and last modules being connected respectively to at least one other module, each intermediate module being connected to two other modules, each module being connected to another module by a connection including at least one digital bus, the system including an electric signal traveling along the chain and consequently through each module and each digital bus;

wherein:
each digital bus is a hardened digital bus that withstands external electromagnetic disturbances;
after passing through a module, the electric signal contains information that has not been modified by the module through which the signal has passed and addressed to at least one other module of the system, together with specific information added by the module through which the signal has passed and addressed to at least one other module;
each intermediate module includes at least one wired logic signal processor means enabling the signal to pass through each intermediate module in a predetermined short time $T_t$; and
the time $T_t$ taken by the signal to pass through a module is less than or equal to the duration for transmitting a word plus a space between two words contained in the signal.

16. An information exchange system comprising:
a chain of onboard modules provided with a first module, a last module, and at least one intermediate module, the first and last modules being connected respectively to at least one other module, each intermediate module being connected to two other modules, each module being connected to another module by a connection including at least one digital bus, the system including an electric signal traveling along the chain and consequently through each module and each digital bus;

wherein:
each digital bus is a hardened digital bus that withstands external electromagnetic disturbances;
after passing through a module, the electric signal contains information that has not been modified by the module through which the signal has passed and addressed to at least one other module of the system, together with specific information added by the module through which the signal has passed and addressed to at least one other module;

each intermediate module includes at least one wired logic signal processor means enabling the signal to pass through each intermediate module in a predetermined short time $T_t$;

the first and last modules are each connected to two modules, the information exchange system thus forming a continuous loop that is closed, the first module and the last module respectively including at least one wired logic signal processor means; and one of the modules is a main module and the other modules are secondary modules, the main module comprises control means and the secondary modules are peripherals, the control means delivering control information to the peripherals, the control information constituting the main portion, and the peripherals delivering to the control means information about their respective states, which information constitutes the secondary portion, the control information from the control means and the information about the states of the peripherals being capable of being transmitted in a common travel cycle of the electric signal containing the information in the information exchange system.

* * * * *